Figure 1:
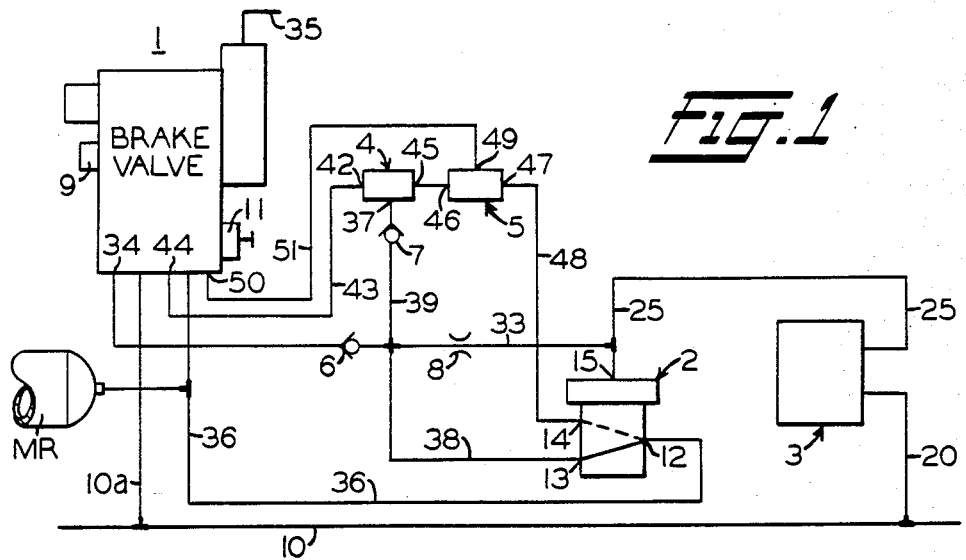

United States Patent [19]
Balukin et al.

[11] Patent Number: 4,552,412
[45] Date of Patent: Nov. 12, 1985

[54] BRAKE PIPE CHARGING CUT-OFF ARRANGEMENT

[75] Inventors: Richard F. Balukin, Penn Hills; John R. Reiss, North Versailles, both of Pa.

[73] Assignee: American Standard Inc., Wilmerding, Pa.

[21] Appl. No.: 632,985

[22] Filed: Jul. 20, 1984

[51] Int. Cl.⁴ .............................................. B60T 11/32
[52] U.S. Cl. ...................................................... 303/67
[58] Field of Search ...................... 303/56, 63, 66, 67, 303/81, 82, 86

[56] References Cited
U.S. PATENT DOCUMENTS 3,022,119 2/1962 May ........................................ 303/67
3,749,453 7/1973 Wilson et al. ........................... 303/67

*Primary Examiner*—Duane A. Reger
*Attorney, Agent, or Firm*—G. J. Falce

[57] ABSTRACT

A brake pipe charging cut-off arrangement for a locomotive air brake in which a rate sensing valve responds to an emergency rate of reduction of brake pipe pressure to vent the control chamber of an actuating valve. This causes the actuating valve to be positioned to connect pressure to the brake pipe cut-off valve of the locomotive brake valve device to interrupt charging of the brake pipe. Following a predetermined time delay of such duration as to assure a complete halt of the train by the resulting emergency brake application, the rate sensing valve automatically resets to terminate venting of the actuating valve control chamber. The actuating valve is then conditioned to be reset on the lead unit by movement of the brake valve handle to emergency position. On a trail unit, a unique arrangement of double check valves sense the proper operating condition of a trail unit brake valve device to automatically reset the actuating valve.

8 Claims, 4 Drawing Figures

BRAKE PIPE CHARGING CUT-OFF ARRANGEMENT

BACKGROUND OF THE INVENTION

The present invention is related to locomotive air brake apparatus and especially to such apparatus for cutting off the brake pipe charging function of the locomotive brake valve device in response to an emergency rate of brake pipe pressure reduction, as occurs for example due to a break-in-two between the normally coupled cars and/or locomotives of a railway train.

It is common practice to provide charging cut-off of the train brake pipe pressure in response to an emergency rate of reduction of brake pipe pressure in order to enhance the ability of the brake equipment to automatically produce an emergency brake application in response to such brake pipe pressure reduction. One such device employed to provide the rake pipe charging cut-off function is the A-1 Charging Cut-Off Pilot Valve employed in the standard 26-L Locomotive Brake Equipment shown in WABCO Instruction Pamphlet No. 5071-6. This valve, however, is somewhat intolerant to harsh environmental conditions and is thus limited in its location, in addition to being relatively expensive.

An alternative arrangement disclosed in the aforementioned Instruction Pamphlet discloses a pair of RELAYAIR type valves in a scheme functionally similar to the previous mentioned arrangement. Both of these schemes are designed to operate with a standard 26-C type brake valve, also shown in the mentioned Instruction Pamphlet, by supplying air to actuate the brake pipe cut-off valve.

In addition, WABCO Instruction Pamphlet No. 5071-24 shows another brake pipe charging cut-off arrangement in which a single, modified RELAYAIR valve designated SI-1 unit is arranged to pilot a valve in the 26-E type brake valve, in response to a reduction of brake pipe pressure at an emergency rate. This pilot valve, in turn, supplies actuating air to the brake pipe cut-off valve to cut off brake pipe charging. The SI-1 unit is more tolerant to environmental conditions than the counterpart A-1 Charging Cut-Off Pilot Valve and is also less expensive. This cost savings, however, is offset by the added cost of a special back cover to accommodate the pilot valve in the 26-E type brake valve, with which the SI-1 unit is employed.

SUMMARY OF THE INVENTION

The object of the present invention is to provide a simplified, less costly, environmentally tolerant, yet highly reliable arrangement for cutting off charging of the train brake pipe by the locomotive brake valve device in response to an emergency reduction of the brake pipe pressure.

Another object of the invention is to provide a brake pipe charging cut-off arrangement according to the foregoing object that is suitable for use in either a lead or trailing mode of locomotive operation.

Briefly, the invention comprises a first two-position, three connection pilot valve via which the brake pipe cut-off valve of a conventional locomotive brake valve is operated to interrupt the brake pipe charging function when a second rate sensitive, two-position, two-connection valve is actuated in response to an emergency rate of reduction of brake pipe pressure. This second valve is self-resetting following a predetermined blowdown time of a trapped volume of air via the venting brake pipe. This conditions the first valve to be reset on a lead unit by movement of the brake valve handle into emergency position. A unique arrangement of double check valves provides an indication of when the unit is a trailing unit and assures that on such a trailing unit, the first pilot valve will be automatically reset upon expiration of the predetermined blowdown time following an emergency reduction of brake pipe pressure without requiring movement of the brake valve handle to emergency position.

Figure 2:
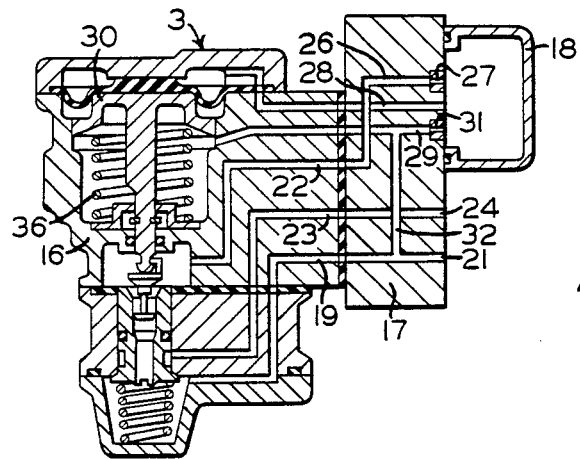
Figure 3:
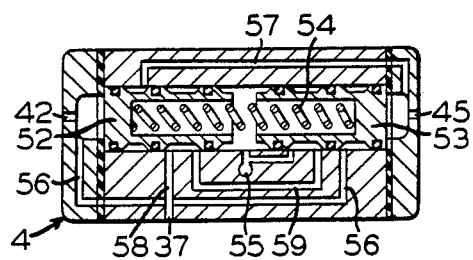
Figure 4:
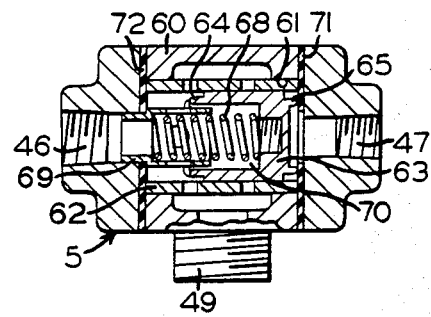

These and other objects and attendant advantages of the present invention will become apparent from the following more detailed explanation of a preferred embodiment of the invention when taken with the accompanying drawings in which:

FIG. 1 is a system diagrammatic showing a preferred embodiment of the invention; and FIGS. 2, 3 and 4 are sectional assembly views of a respective rate sensor, reverse double check valve, and spring biased double check valve shown in block form in FIG. 1.

DESCRIPTION AND OPERATION

Referring now to FIG. 1 of the drawings, the system comprises a standard 26-C type locomotive brake valve device 1, an actuating valve 2, a rate sensing valve 3, a pair of double check valves 4 and 5, a pair of one-way check valves 6 and 7, and a choke 8.

As is well known, brake valve device 1 includes a brake pipe cut-off valve 9 via which compressed air normally flows to and from the train brake pipe 10 via a branch passage 10a, and a cut-out valve 11 having a cut-out position in which compressed air from the locomotive main reservoir MR is connected via internal passageways to the control chamber of the brake pipe cut-off valve to effect closure thereof and accordingly terminate the flow of brake pipe air to and from the brake pipe. When a locomotive is operated as a trail unit, the cut-out valve 11 is set in cut-out position, and when the locomotive is operated as a lead unit, the cut-out valve 11 is set in cut-in position in which the cut-off valve control chamber is vented to establish normal flow of air to and from the brake pipe 10.

Actuating valve 2 is a two position, three-connection, pneumatically actuated, spring return valve in which a common inlet port 12 is connected to a pipe 36 leading to a source of compressed air, such as the main reservoir MR. In the actuated position, port 12 is connected internally to a port 13, while a port 14 is blanked. In the deactuated position, port 14 is connected internally to port 12, while the port 13 is blanked. A port 15 conducts control pressure to a diaphragm piston actuator, or the like (not shown), to urge operation of valve 2 toward its actuated position, while a return spring (also not shown) in the absence of port 15 control pressure urges the valve 2 toward its deactuated position. A standard H-5 RELAYAIR valve manufactured by the Westinghouse Air Brake Company may be employed as actuating valve 2.

Shown in FIG. 2 is a conventional SI-1 unit, which may be employed as rate sensing valve 3. This SI-1 unit is manufactured by the Westinghouse Air Brake Company, and comprises a pneumatic portion 16, which is a conventional HB-5 RELAYAIR valve, a pipe bracket 17, and a volume reservoir 18. The HP-5 RELAYAIR valve employed as pneumatic portion 16 is a pneumatically actuated, spring returned, two-position, three-connection valve device in which a common inlet port 19 is connected to brake pipe 10, via a pipe 20 and passage 21 in pipe bracket 17. In the actuated position, a port 22 is connected internally to port 19, while a port 23 is blanked. In the deactuated position, port 23 is connected internally to port 19, while port 22 is blanked. A passage 24 in pipe bracket 17 connects port 23 to a pipe 25 leading to control port 15 of actuating valve 2. A passage 26 in pipe bracket 17 connects port 22 to volume reservoir 18 via a choke 27. Also provided in pipe bracket 17 are passages 28 and 29, which extend between volume reservoir 18 and the respective opposite sides of a diaphragm piston actuator 30, passage 29 having a choke 31 between volume 18 and a branch passage 32 leading to passage 21. A return spring 36 urges piston actuator 30 toward the deactuated position.

Also connected to control port 15 of actuating valve 2 is a pipe 33 leading from port 34 of brake valve device 1. Port 34 is pressurized in a well-known manner when the automatic handle 35 of brake valve device 1 is moved to emergency position. Pipe 33 includes one-way check valve 6 and choke 8.

A pipe 38 connects port 13 of actuating valve 2 to pipe 33 at a point intermediate check valve 6 and choke 8.

Also connected to pipe 33 at a point intermediate check valve 6 and choke 8 is a pipe 39 leading from the outlet 37 of a standard reverse type double check valve device 4, as for example, the 26-A double check valve manufactured by the Westinghouse Air Brake Company. Pipe 39 is provided with one-way check valve 7. One inlet 42 of double check valve device 4 is connected via a pipe 43 to a port 44 of brake valve device 1, which port 44 is pressurized in handle-off and emergency positions of the brake valve handle 35. The other inlet 45 of double check valve device 4 is connected to one inlet 46 of spring biased double check valve device 5. The other inlet 47 of double check valve device 5 is connected via a pipe 48 to port 14 of actuating valve 2, while its outlet 49 is connected to a port 50 of brake valve device 1 via a pipe 51. This port 50 is internally piped to the brake pipe cut-off valve 9, and is pressurized when the cut-out valve 11 is manually set in the cut-out position, such as when a locomotive is being operated as a trail unit.

As shown in FIG. 3, reverse double check valve 4 comprises a pair of spool valve members 52 and 53 having a spring 54 therebetween that forces the respective spool members apart in the absence of pressure at the respective inlets 42 and 45. In this position, the respective spool members in combination connect air from the outlet 37 to atmosphere at exhaust port 55. A supply passage 56 connects inlet 42 to the bore of spool member 53 where passage 56 is blanked in the absence of air at inlet 45. Similarly, a supply passage 57 connects inlet 45 to the bore of spool member 52 where passage 57 is blanked in the absence of air at inlet 42. If inlet 42 is pressurized prior to inlet 45, spool member 52 is shifted rightwardly to connect supply passage 57 to outlet 37 via a passage 58. Thus, if inlet 45 is subsequently pressurized, this pressure will be connected to outlet 37 via the aforementioned connections. Conversely, if inlet 45 is pressurized prior to inlet 42, spool member 53 is shifted leftwardly to connect supply passage 56 to a crossover passage 59 that is normally connected via spool member 53 to passage 58 and outlet 37. When inlet 42 is subsequently pressurized, this pressure will be present at outlet 37. It will be apparent therefore that in order to develop a pressure signal at outlet 37, both inputs must be pressurized concurrently. In this sense, the reverse double check valve 4 provides an AND logic function.

As shown in FIG. 4, spring biased double check valve device 5 is formed by a body 60 having a through bore 61 in which is pressed a sleeve bushing 62. Reciprocally contained in bushing 62 is a single shuttle valve 63 having annular seats 64 and 65 formed at its opposite ends. A pair of end caps having inlets 46 and 47 close bore 61. A bias spring 68 acts between a spring seat 69 at inlet 46 and a cavity 70 formed in the end of shuttle member 63 adjacent inlet 46 to normally position the shuttle so that annular seat 65 sealingly engages a gasket 71 between the end cap having inlet 47 and body 60. In this position, fluid pressure effective at inlet 47 is cut off from an outlet 49 in body 60, while concurrently valve seat 64 is disengaged from a gasket 72 between the end cap having inlet 46 and body 60, so as to establish fluid pressure communication between inlet 46 and outlet 49. When shuttle member 63 is shifted to its other position, in opposition to spring 68, annular seat 64 engages gasket 72 and seat 65 is disengaged from gasket 71 to interrupt fluid pressure communication between inlet 46 and outlet 49 and concurrently establish communication between inlet 47 and outlet 49.

The system, according to the present invention, operates in response to an emergency rate of reduction of brake pipe pressure to cut off brake pipe charging at the brake valve 1. On a lead unit, cut-out valve 11 is set in cut-in position, in which position the brake pipe cut-off valve control chamber is depressurized to permit compressed air to flow to and from the brake valve device 1 in the usual, well-known manner. Air is also connected from main reservoir MR to port 15 of actuating valve 2 via pipe 36, ports 12 and 13, pipe 38, choke 8, and pipe 33. This air at port 15 of actuating valve 2 maintains actuating valve 2 in the actuated condition shown, and is also connected via pipe 25 to passages 24 and 23 of rate sensor valve 3, where it is blanked by pneumatic portion 16.

When brake pipe pressure is reduced at a service rate, the air above piston 30 is reduced via passage 28, volume reservoir 18, and thence via parallel paths to brake pipe 10. One path consists of choke 27, passages 26 and 22, the valving of pneumatic portion 16, and passages 19 and 21. The other path consists of choke 31, and passages 29, 32 and 21. The flow orifices of these chokes 27 and 31 are such as to maintain a balanced pressure condition across piston 30 to normally maintain the piston in a stable condition; i.e., a service rate of brake pipe pressure reduction.

When brake pipe pressure is reduced at an emergency rate, the combined air flow via the parallel flow orifices of chokes 27 and 31 is insufficient to balance the higher emergency rate of brake pipe reduction, thus establishing a downward pressure differential across piston 30 sufficient to overcome the opposing bias force of spring 36. Upon consequent actuation of piston 30, the valving of pneumatic portion 16 cuts off the charging communication between passages 19 and 22, while concurrently connecting passage 19 to passage 23. This results in the air at port 15 of actuating valve 2 being exhausted via pipe 25, passages 24, 23, 19 and 21 of rate sensor valve 3, pipe 20, and brake pipe 10. Since choke 8 restricts the flow of supply air to port 15 via passages 38 and 33, the pressure at port 15 is quickly depleted. The actuating valve return spring (not shown) is thus effective to force the actuating valve upwardly to its deactuated position in which main reservoir air is connected via port 14, pipe 48, inlet 47 and outlet 49 of double check valve 5, pipe 51, and port 50 to brake valve device 1. From port 50 of brake valve device 1, this air is connected via internal passageways of brake valve device 1 to the control chamber of brake valve cut-off valve 9 to effect closure thereof and accordingly terminate the flow of air to brake pipe 10 during the period the emergency rate of reduction of brake pipe pressure is occurring.

Also in the actuated position of piston 30, passage 22 is cut off from passage 19. Accordingly, the pressure above piston 30 is forced to exhaust via the single choke 31, which is sized in conjunction with the volume of reservoir 18 to establish a predetermined time period during which the actuating air above piston 30 blows down to a value sufficient to allow spring 36 to reset piston 30 to its deactuated position. The duration of this time period is selected to assure that the emergency brake application that results from the above-mentioned emergency reduction of brake pipe pressure brings the train to a complete halt.

Once rate sensor valve 3 is reset, as just explained, the brake application may be released by initially moving the brake valve handle 35 to emergency position. In emergency position, main reservoir air is connected from pipe 36 to brake valve port 34 via internal passages and valving in brake valve device 1 in a well-known manner. Air thus flows to control port 15 of actuating valve 2 via one-way check valve 6 and choke 8 to reset the actuating valve to its actuated position. Air is then reconnected from main reservoir MR to control port 15 via ports 12 and 13, pipe 38, choke 8, and pipe 33 to latch the actuating valve in its actuated position. Consequently, pressure in pipes 48 and 51 is cut off from the pressure supply and are exhausted via a bleed orifice (not shown) associated with the cut-out valve 11 of brake valve device 1, as is well known. Accordingly, the control chamber of brake pipe cut-off valve 9 is depressurized to thereby condition brake valve device 1 to reestablish flow of air to brake pipe 10.

Subsequent movement of the brake valve handle from emergency to release position on the lead locomotive unit is thus effective to recharge the train brake pipe via the brake pipe charging cut-off valve 9.

On a trailing unit, operating conditions require that the handle 35 of brake valve 1 be removed and that the cut-out valve 11 be set in cut-out position. In order to remove handle 35, the handle must be placed in handle-off position, in which position port 44 is pressurized in a well-known manner. In cut-out position of cut-out valve 11, port 50 of brake valve 1 is also pressurized in a well-known manner. This pressurization of port 50 results in the control chamber of the brake pipe cut-off valve 9 being pressurized on the trail unit brake valve to cut out the brake pipe charging function of the brake valve on the trail unit. Air at port 50 is also connected via pipe 51 to the outlet 49 of double check valve 5. Shuttle valve 63 is biased by spring 68 so as to be normally located in its right-hand position in which shuttle valve seat 64 is disengaged from gasket seal 72 to thereby establish a flow path between outlet 49 and inlet 46, as shown in FIG. 4. Air at outlet 49 is thus connected to inlet 45 of reverse double check valve 4.

As shown in FIG. 3, spool member 53 is shifted leftwardly into engagement with spool member 52 by the pressure at inlet 45. Spool member 52 interrupts the connection of air from inlet 45 to outlet 37 via passage 57, while spool member 53, in its shifted position, communicates passages 56 and 59. Thus, with pressurization of brake valve port 44 in handle-off position, communicates passages 56 and 59. Thus, with pressurization of brake valve port 44 in handle off position, air subsequently connected to inlet 42 of reverse double check valve 4 via pipe 43 is, in turn, connected via the communicated passages 56 and 59 to outlet 37.

In the event inlet 42 is pressurized prior to pressurization of opposing inlet 45 of reverse double check valve 4, spool member 52 will be shifted rightwardly into engagement with spool member 53. In this position, spool member 53 interrupts the connection of air from inlet 46 to outlet 37 via passage 56, while spool member 52, in its shifted position, communicates passages 57 and 58. Thus, with pressurization of brake valve port 50 in cut-out position of the brake valve cut-out valve 11, air subsequently connected to inlet 45 of reverse double check valve 4 via pipe 51, outlet 49 of double check valve 5, and inlet 46 is, in turn, connected via the communicated passages 57 and 58 to outlet 37.

From the foregoing, it will be apparent that both inlets 42 and 45 of reverse double check valve 4 must be pressurized in order to obtain an output at outlet port 37. Thus, when the brake valve handle 35 is set in handle-off position and the brake valve cut-out valve 9 is set in cut-out position, air at outlet 37 is connected to control port 15 of actuating valve 2 via one-way check valve 7, pipe 39, choke 8, and pipe 33. Thus, it will be apparent that on a trail unit, this continuous source of air supplied to control port 15 in accordance with the operating requirement of a trail unit being fulfilled will automatically reset actuating valve 2, when rate sensor valve 3 resets following actuation in response to an emergency brake application.

Having now described the invention, what we claim as new and desire to secure by Letters Patent, is:

1. A brake pipe charging cut-off system for a railway vehicle comprising:
   (a) a source of fluid under pressure;
   (b) a brake pipe normally charged with fluid pressure from said source;
   (c) a brake valve device including a brake pipe cut-off valve operable in response to pressurization thereof to interrupt said charging of said brake pipe;
   (d) an actuating valve having a control chamber pressurization of which effects operation of said actuating valve to a first position in which said source of fluid under pressure is connected to said control chamber and depressurization of which effects operation of said actuating valve to a second position in which said source of fluid under pressure is cut off from said control chamber and connected to said brake pipe cut-off valve;
   (e) rate sensing valve means for venting said control chamber of said actuating valve in response to an emergency rate of reduction of said brake pipe pressure; and
   (f) a choke via which said source of fluid pressure is connected to said control chamber in said first position of said actuating valve.

2. A brake pipe charging cut-off system, as recited in claim 1, wherein said brake valve device further includes:
   (a) a brake valve handle having an emergency position; and (b) a first pipe connected to said control chamber of said actuating valve, said first pipe being pressurized in said emergency position of said brake valve handle to effect operation of said actuating valve to said first position.

3. A brake pipe charging cut-off system, as recited in claim 2, wherein said rate sensing valve means comprises:
   (a) a control piston subject on the opposite sides to the pressure in said brake pipe and on one of said sides to a return spring;
   (b) a two-position valve assembly connected to said control piston operative in a first position to connect fluid pressure from said brake pipe to the side of said control piston opposite said one side via a first passage, and operative in a second position to establish fluid pressure communication between said brake pipe and said control chamber of said actuating valve;
   (c) a second passage via which fluid pressure is connected directly to said one side of said control piston; and
   (d) first choke means in said first passage for restricting the exhaust of said brake pipe fluid under pressure from said opposite side of said control piston whereby a force imbalance is developed across said control piston sufficient to overcome the force of said return spring, when a reduction of fluid pressure from said brake pipe is at an emergency rate, such that said control piston is effective to actuate said valve assembly to said second position, said emergency rate being greater than a normal rate of brake pipe pressure reduction.

4. A brake pipe charging cut-off system, as recited in claim 3, further comprising timing means for maintaining said valve assembly actuated in said second position for a predetermined period of time following said operation of said control piston in response to said emergency rate of reduction of said brake pipe fluid under pressure.

5. A brake pipe charging cut-off system, as recited in claim 4, wherein said timing means comprises:
   (a) a volume reservoir communicated with said opposite side of said control piston; and
   (b) second choke means for restricting the exhaust of fluid under pressure from said opposite side of said control piston to provide said predetermined period of time.

6. A brake pipe charging cut-off system, as recited in claim 1, further comprising:
   (a) said brake valve device including:
      (i) a brake valve handle having a handle-off position; and
      (ii) a cut-out valve having a cut-out position;
   (b) a first pipe pressurized in said handle-off position of said brake valve device;
   (c) a second pipe pressurized in said cut-out position of said cut-out valve;
   (d) a first double check valve having an outlet connected to one of said first and second pipes and one inlet normally communicated with said outlet of said first double check valve; and
   (e) a second double check valve having one inlet connected to said one inlet of said first double check valve, another inlet connected to the other of said first and second pipes, and an outlet connected to said control chamber of said actuating valve, said outlet of said second check valve being pressurized only when pressure is present concurrently at said one and said another inlets.

7. A brake pipe charging cut-off system, as recited in claim 6, wherein said first double check valve further comprises another inlet to which said source of fluid pressure is connected in said second position of said actuating valve.

8. A brake pipe charging cut-off system, as recited in claim 7, further characterized in that said first double check valve is spring biased in one of two positions wherein said normal communication between said outlet and said one inlet of said first double check valve is established.

* * * * *